(12) United States Patent
Moe et al.

(10) Patent No.: US 12,208,904 B2
(45) Date of Patent: Jan. 28, 2025

(54) SPLIT CABIN ATTENDANT SEAT

(71) Applicant: B/E Aerospace, Inc., Winston Salem, NC (US)

(72) Inventors: Daniel N. Moe, Mukilteo, WA (US); Max Slavin, Colorado Springs, CO (US); Chad Pacheco, Colorado Springs, CO (US)

(73) Assignee: B/E AEROSPACE, INC., Winston Salem, NC (US)

( * ) Notice: Subject to any disclaimer, the term of this patent is extended or adjusted under 35 U.S.C. 154(b) by 157 days.

(21) Appl. No.: 17/884,271

(22) Filed: Aug. 9, 2022

(65) Prior Publication Data

US 2024/0051666 A1 Feb. 15, 2024

(51) Int. Cl.
*B64D 11/06* (2006.01)

(52) U.S. Cl.
CPC ........ *B64D 11/0691* (2014.12); *B64D 11/064* (2014.12)

(58) Field of Classification Search
CPC .......................... B64D 11/0691; B64D 11/064
See application file for complete search history.

(56) References Cited

U.S. PATENT DOCUMENTS

| | | | |
|---|---|---|---|
| 4,913,487 | A | 4/1990 | Breckel et al. |
| 9,382,005 | B2 | 7/2016 | Schliwa et al. |
| 10,246,194 | B2 | 4/2019 | Ehlers et al. |
| 11,124,299 | B2 | 9/2021 | McKee |
| 11,130,575 | B2 | 9/2021 | Vaninetti et al. |
| 2014/0125092 | A1 | 5/2014 | Schreuder et al. |
| 2014/0209741 | A1 | 7/2014 | Boenning et al. |
| 2022/0024591 | A1 | 1/2022 | Dowty et al. |

FOREIGN PATENT DOCUMENTS

DE    102011116521    4/2013

OTHER PUBLICATIONS

European Patent Office, European Search Report dated Dec. 7, 2023 in Application No. 23190120.8.

*Primary Examiner* — Anthony D Barfield
(74) *Attorney, Agent, or Firm* — SNELL & WILMER L.L.P.

(57) ABSTRACT

A cabin attendant seat includes a housing having an upper portion and a lower portion, a headrest rotatably coupled to the upper portion, a seat pan coupled to the lower portion, and a drop-down tray assembly rotatably coupled to the upper portion. The seat pan is detached from the headrest. The drop-down tray assembly and the headrest are configured to rotate along a first axis such that the drop-down tray assembly defines a platform.

15 Claims, 11 Drawing Sheets

SPLIT CABIN ATTENDANT SEAT

FIELD

The present disclosure relates to aircraft seats and, more specifically, to a split assembly for a cabin attendant seat.

BACKGROUND

Aircraft cabin attendant seats (CAS, also referred to as stowable seats or jump seats) are used for flight attendant safety and comfort during taxi, takeoff, landing, and inflight rest periods. Useable storage space in an aircraft cabin may be limited, and areas within the flight attendant seats may be used for storage. For example, life vests, personal breathing apparatus ("PBE"), or other emergency equipment may be housed within a compartment located near the bottom of the attendant seat. However, space within the attendant seat tends to be limited. Further, space within the aircraft is limited and the CAS typically provides no other function when not in use.

SUMMARY

A cabin attendant seat includes a housing having an upper portion and a lower portion, a headrest rotatably coupled to the upper portion, a seat pan coupled to the lower portion, and a drop-down tray assembly rotatably coupled to the upper portion. The seat pan is detached from the headrest. The drop-down tray assembly and the headrest are configured to rotate along a first axis such that the drop-down tray assembly defines a platform.

In various embodiments, the drop-down tray assembly further includes a first surface and a second surface. The first surface is configured to rotate along a second axis perpendicular to the first axis such that the second surface defines the platform.

In various embodiments, the drop-down tray assembly further includes a support arm configured to rotate along the first axis and the second axis, and configured to support the drop-down tray assembly in a deployed position.

In various embodiments, the upper portion and the lower portion are separated by a gap. A slide-out table is configured to be stored in the housing and accessible from the housing via the gap.

In various embodiments, the cabin attendant seat further includes a lower storage compartment disposed in the lower portion below the seat pan.

In another aspect, a cabin attendant seat includes a housing having an upper portion and a lower portion, a headrest rotatably coupled to the upper portion, and a panel defining the lower portion. The panel is configured to rotate relative the housing and independently from the upper portion.

In various embodiments, rotating the panel to an open position exposes a volume configured to receive a storage item.

In various embodiments, the panel comprises an interior wall and an exterior wall opposite the interior wall, the interior wall configured to be oriented toward the volume in a closed position.

In various embodiments, the cabin attendant seat further includes a seat pan coupled to the exterior wall, and a latch assembly configured to secure the panel to the housing.

In various embodiments, the upper portion defines a bar unit. The bar unit comprising at least one window.

In various embodiments, the cabin attendant seat further includes a drop-down tray assembly rotatably coupled to the upper portion. The drop-down tray assembly and the headrest are configured to rotate along a first axis such that the drop-down tray assembly defines a platform. The panel is configured to rotate along a second axis perpendicular to the first axis.

In yet another aspect, an aircraft includes a first cabin attendant seat and a second cabin attendant seat. The first cabin attendant seat includes a first housing having a first upper portion and a first lower portion, a first headrest rotatably coupled to the first upper portion, and a first drop-down tray assembly rotatably coupled to the first upper portion. The first drop-down tray assembly and the first headrest are configured to rotate along a first axis. The second cabin attendant seat, includes a second housing having a second upper portion and a second lower portion, a second headrest rotatably coupled to the second upper portion, and a panel defining the second lower portion. The panel is configured to rotate relative the second housing and independently from the second upper portion.

In various embodiments, the first cabin attendant seat and the second cabin attendant seat are in confronting relation.

In various embodiments, the first drop-down tray assembly includes at least one extension configured to extend from the first drop-down tray assembly toward the second cabin attendant seat.

In various embodiments, the second cabin attendant seat further includes a second drop-down tray assembly rotatably coupled to the second upper portion. The second drop-down tray assembly and the second headrest are configured to rotate along the first axis.

In various embodiments, the first upper portion and the first lower portion are separated by a first gap. The first drop-down tray assembly is configured to be hinged in the first gap. The second upper portion and the second lower portion are separated by a second gap. The second drop-down tray assembly is configured to be hinged in the second gap.

In various embodiments, the first drop-down tray assembly is configured to be housing within a workstation cavity disposed in the first housing. The first drop-down tray assembly exposing the workstation cavity when in a deployed position.

In various embodiments, the workstation cavity includes at least one of a power outlet or a network port to couple to a laptop.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact. Surface shading lines may be used throughout the figures to denote different parts but not necessarily to denote the same or different materials.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

Disclosed herein is a cabin attendant seat (CAS) that may be installed on a monument or bulkhead as a two-part assembly with a gap between an upper unit and a lower unit. The lower unit may carry the majority of flight load and crash loads, for instance, and the upper unit may include a headrest and mounting frame. The gap between the units allows room for a door split-line line, a hinge-line, and/or a slide-out table to extend between the two units at work-deck height. Due to the separated configuration of the two units, the upper unit can be mounted and movable on a separate surface from the lower unit, and vice versa. For instance, one surface may be fixed while the other is articulating, or both surfaces may be articulating.

Figure 1:
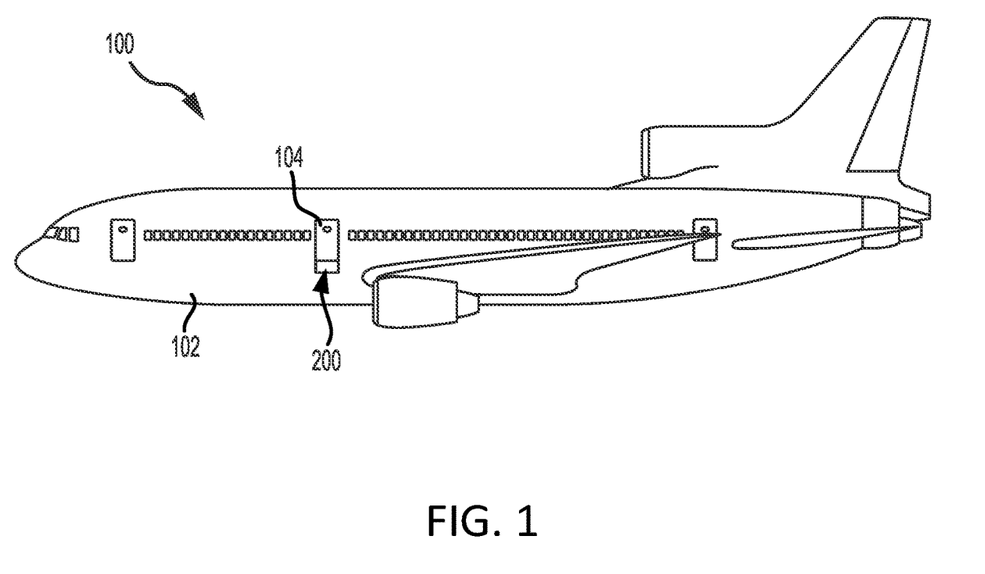
FIG. 1 illustrates an aircraft, in accordance with various embodiments

With reference to FIG. 1, there is illustrated an example aircraft 100 that may incorporate one or more split cabin attendant seats (CAS) in accordance with this disclosure. The aircraft 100 includes a fuselage 102 having plurality of exit doors, including an exit door 104. Aircraft 100 includes one or more CAS (e.g., seat 200 described herein) positioned near a corresponding exit door 104. For example, aircraft 100 includes seat 200 positioned near exit door 104. While seat 200 is disclosed as positioned near exit door 104, it is further contemplated and understood that one or more CAS may be located at other locations. Although shown in FIG. 1 generally as a turbofan aircraft in which the engines are gas turbine engines, it should be noted that the aircraft 100 can be any suitable type of aircraft having any suitable number of engines of any suitable type.

Figure 2A:
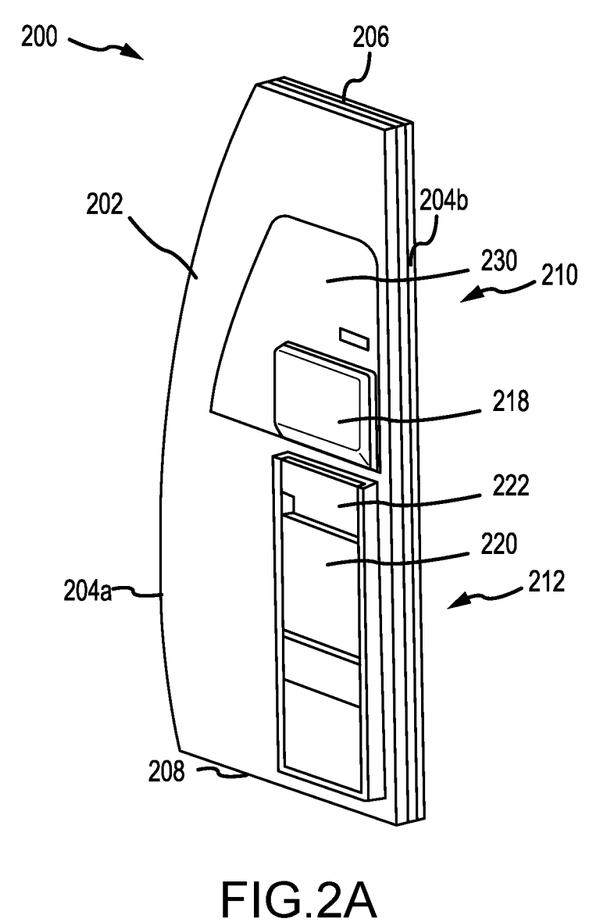
FIGS. 2A, 2B, 2C, 2D, and 2E illustrate a cabin attendant seat having a drop-down tray assembly, in accordance with various embodiments.
Figure 2B:
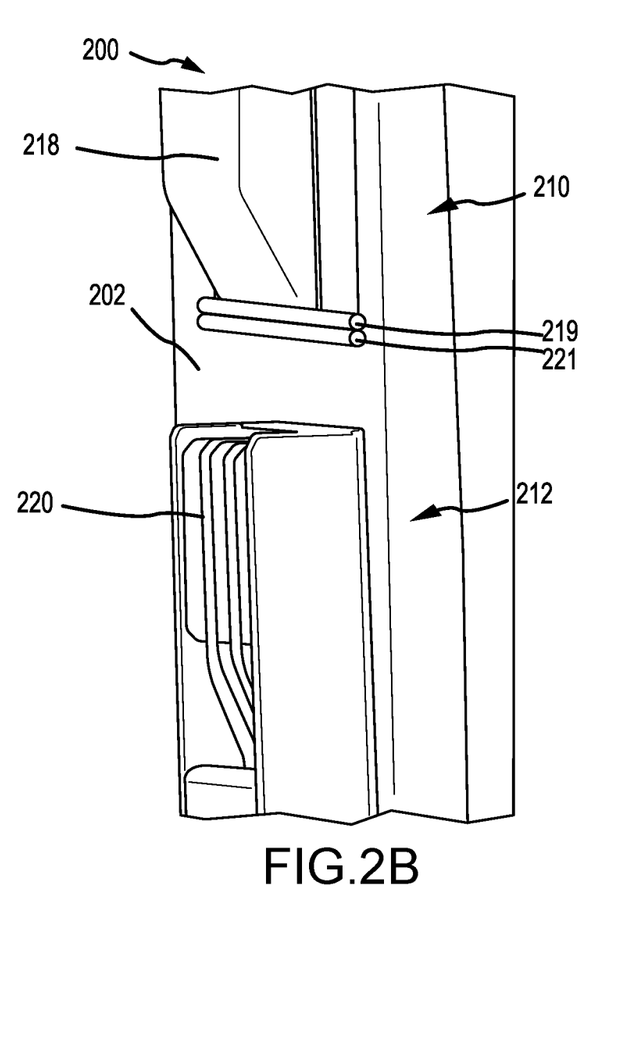
Figure 2C:
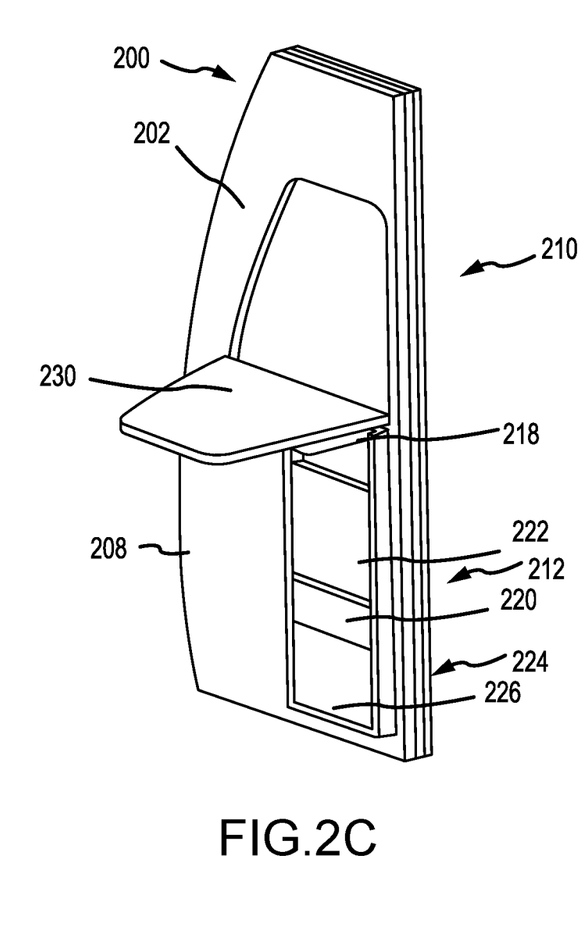

Referring now to FIGS. 2A-2C, a cabin attendant seat (CAS) 200 (referred to herein as "seat 200") is illustrated, in accordance with various embodiments. Seat 200 includes a housing 202. Housing 202 may provide structural support for seat 200. In this regard, housing 202 may be secured to an aircraft structure, such as a floor or a wall (e.g., of a galley) of an aircraft. In various embodiments, housing 202 may be a 2.0 ft-4.0 ft (e.g., 0.61 m-1.22 m) monument. Housing 202 includes opposing first and second walls 204a, 204b. First and second walls 204a, 204b each extend from a head end 206 of housing 202 to a foot end 208 of housing 202. Seat 200 includes an upper portion 210 and a lower portion 212. The upper portion 210 and the lower portion 212 are discrete portions of the seat 200 such that the upper portion 210 is configured to function (e.g., move, rotate relative to the housing 202, etc.) independently from the lower portion 212.

Seat 200 includes a headrest 218. Particularly, the upper portion 210 comprises the headrest 218. Headrest 218 may be located proximate head end 206 of housing 202. Headrest 218 may be pivotably (e.g., rotatably) coupled to housing 202. For instance, the headrest 218 may be coupled to the upper portion 210 via a hinge 219 such that headrest 218 may be configured to rotate along an axis perpendicular to the first and second walls 204a, 204b such that a user (e.g., a flight attendant) can use the headrest 218 as a platform when extended at least substantially perpendicularly from the housing 202 (e.g., see FIG. 2C). For instance, the headrest 218 as the platform may be used as a workstation, a bar, table, a serving table, tray, etc., as described further herein. As used herein, a platform may refer to any surface suitable for supporting the relevant work equipment, beverage, etc. For instance, the platform may be substantially parallel to the aircraft floor (e.g., perpendicular to the respective housing/monument). In various embodiments, the platform may be angled up to a 45 degree angle (e.g., to be compatible with various tablet and heights of users).

Further, seat 200 includes a seat pan 220 and a backrest 222. Particularly, the lower portion 212 may comprise the seat pan 220 and the backrest 222. Backrest 222 may be located generally between seat pan 220 and headrest 218. For instance, the headrest 218 and the backrest 222 may be separated by a gap having a distance of approximately 1.0 in-4.0 in (e.g., 2.54 cm-10.16 cm). Seat pan 220 may be configured to rotate relative to housing 202. In various embodiments, seat pan 220 may rotate toward and away from backrest 222. For instance, seat pan 220 may be configured to rotate along the axis perpendicular to the first and second walls 204a, 204b such that a user (e.g., a flight attendant) can sit on the seat pan 220 when extended at least substantially perpendicularly from the housing 202. Seat pan 220, backrest 222, and/or headrest 218 may be partially stored within housing 202 of seat 200.

In accordance with various embodiments, seat 200 may include a lower storage compartment 224. Lower storage compartment 224 may be located proximate foot end 205 of housing 202. A housing door 226 may be located over lower storage compartment 224. Door 226 may be pivotably coupled to housing 202. For instance, a release handle 228 may be disposed in door 226. Release handle 228 may be configured to release the door 226, thereby allowing door 226 to pivot away from housing 202.

Seat 200 may further include a drop-down tray assembly 230. The drop-down tray assembly 230 may be configured to rotate with the headrest 218. For instance, the drop-down tray assembly 230 may be coupled to the upper portion 210 via the hinge 219 such that the drop-down tray assembly 230 may be configured to rotate along the axis perpendicular to the first and second walls 204a, 204b such that a user (e.g., a flight attendant) can use the drop-down tray assembly 230 as a platform when extended out at least substantially perpendicularly from the housing 202 (e.g., see FIG. 2C). For instance, the drop-down tray assembly 230 as the platform may be used as a workstation, a bar, table, serving table, tray, etc. as described further herein wherein the headrest 218 is configured to provide additional support to the drop-down tray assembly 230. In various embodiments, the drop-down tray assembly 230 may be coupled to the headrest 118. In various embodiments, the drop-down tray assembly 230 may be configured to rotate independently from headrest 218. For instance, the drop-down tray assembly 230 may be rotatably coupled to the hinge 219 but configured to rotate with the headrest 218 (e.g., the user may choose to only extend the headrest 218). In various embodiments, the drop-down tray assembly 230 may be coupled to a separate hinge 221.

The drop-down tray assembly 230 is configured to provide a stand-up (e.g., a standing height) workstation contained within the housing 202. For instance, the drop-down tray assembly 230 may be received and stored within a workstation cavity 232 of the housing 202. When the drop-down tray assembly 230 is positioned in its extended, or deployed, position (e.g., extending perpendicular to the housing 202), the workstation cavity 232 is exposed. The workstation cavity 232 may be configured to house various components of the drop-down tray assembly 230 such as a work surface, tablet holder, work light, charging station, and/or a notebook caddy. For instance, the drop-down tray assembly 230 includes a first surface 234. The first surface 234 may be used as a workstation platform on its own.

Figure 2D:
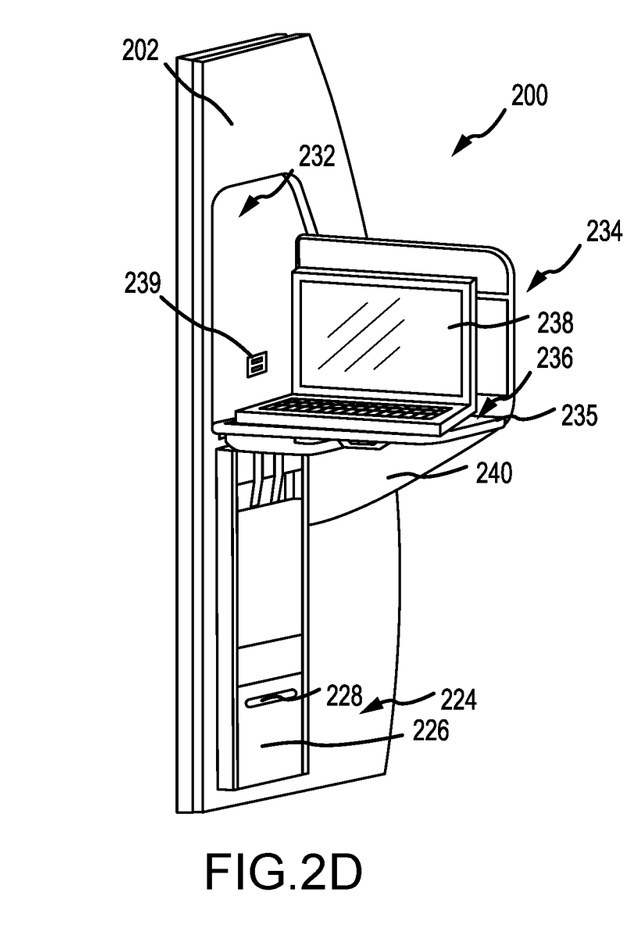
Figure 2E:
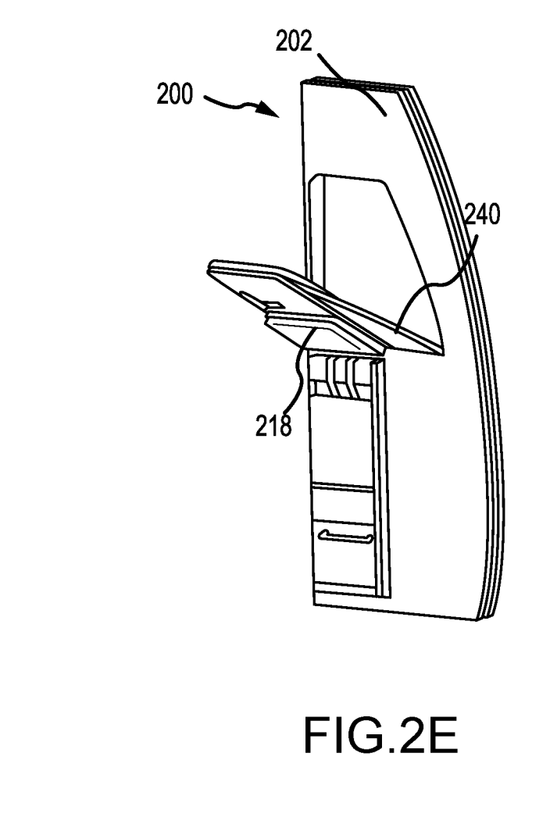

However, referring particularly to FIG. 2D, the drop-down tray assembly 230 may further include a second surface 236. For instance, the first surface 234 may be configured to rotate away from the second surface 236 via a hinge 235 until the first surface 234 is parallel to an axis parallel to the first and second walls 204a, 206a and perpendicular to the second surface 236. Accordingly, the second surface 236 may be used as the workstation platform and the first surface 234 is configured as a back panel. For instance, the drop-down tray assembly 230 a deployed position and with a laptop 238 being positioned thereon. Any appropriate portable computer, tablet, other electronics (e.g., mobile phone), or other articles may be disposed on/supported by the drop-down tray assembly 230 when in its deployed position.

In various embodiments, a power switch, one or more power sockets or electrical outlets (e.g., USB charging port), and one or more wire holders may be incorporated by the workstation cavity 232. In various embodiments, the workstation cavity 232 may include built in inductive charging (e.g., Qi/MagSafe). The wire holder(s) are for wire management and are of a configuration that encompasses clips (e.g., U-shaped; J-shaped), or any appropriate retention structure for retaining a cord, cable, or the like, such as a power cable for a laptop, a tablet, or the like. The workstation cavity 232 may further include a network cable and/or network port 239 to couple to the laptop 238.

The drop-down tray assembly 230 may further include a support arm 240. The support arm 240 is configured to rotate via hinge 219. Once rotated to the deployed position of the drop-down tray assembly 230, the support arm 240 may be configured to further rotate relative to the second surface 236 such that the support arm 240 is perpendicular to the second surface 236, opposite the first surface 234 (e.g., see FIG. 2D).

In various embodiments, the drop-down tray assembly 230 may include one or more latches (not shown) for locking the drop-down tray assembly 230 in its stowed position (e.g., see FIG. 2A). When the latch is disposed in an unlocked configuration, movement of the drop-down tray assembly 230 may be initiated toward its deployed position.

Referring now to FIGS. 3A-3B and 4A-4B, in various embodiments, seat 200 may be a first seat 200. As such, aircraft 100 may include a second seat 300. However, in various embodiments, as described herein, the second seat 300 may be the only seat of aircraft 100. The second seat 300 may comprise a second housing 302 having first and second walls 304a, 304b. In various embodiments, housing 202 may be a 14.0 ft-20.0 ft (e.g., 4.27 m-6.10 m) monument. Further, second housing 302 comprises an upper portion 306 and a lower portion 308. The second housing 302 may comprise a headrest 310, a seat pan 312, and a backrest 314. The second seat 300 may be structured similarly to the first seat 200 with respect to the headrest 310, the seat pan 312, and the backrest 314 such that the headrest 310, the seat pan 312, and the backrest 314 correspond to the headrest 218, the seat pan 220, and the backrest 222, respectively, of seat 200. For instance, the upper portion 306 comprises the headrest 310 and the lower portion 308 comprises the seat pan 312 and the backrest 314 such that the headrest 310 functions discretely from the seat pan 312 and the backrest 314.

Figure 3A:
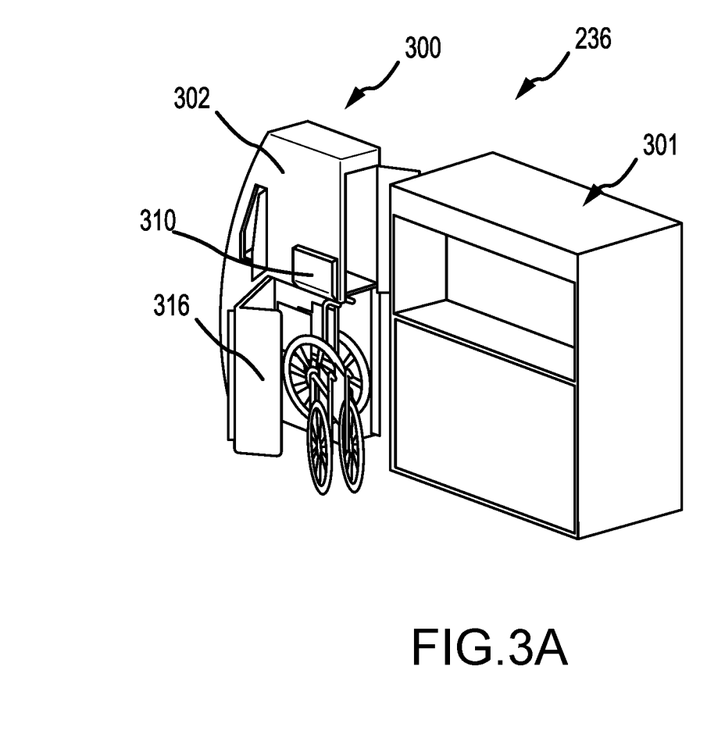
FIGS. 3A-3B illustrate a cabin attendant seat having a storage compartment door in an open position and in a closed position, respectively, in accordance with various embodiments.
Figure 3B:
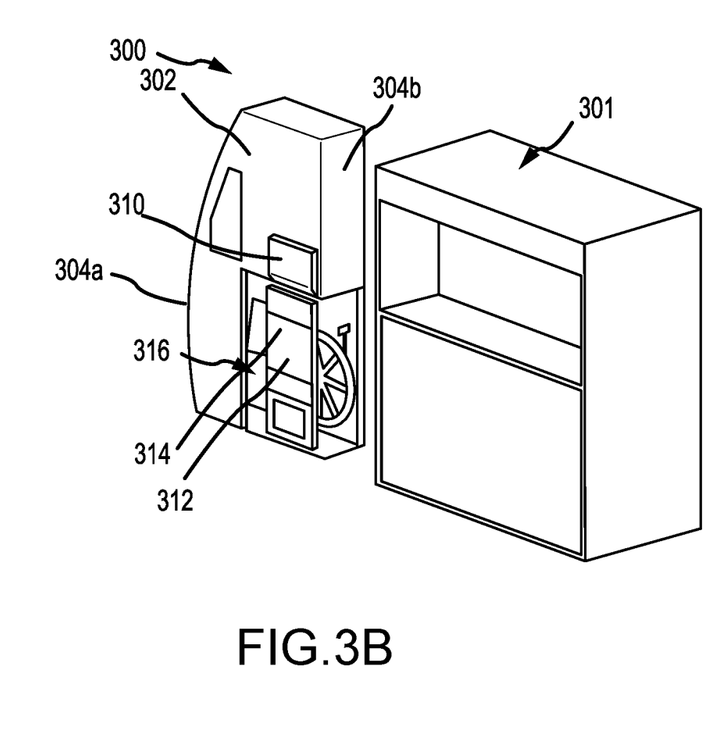
Figure 4A:
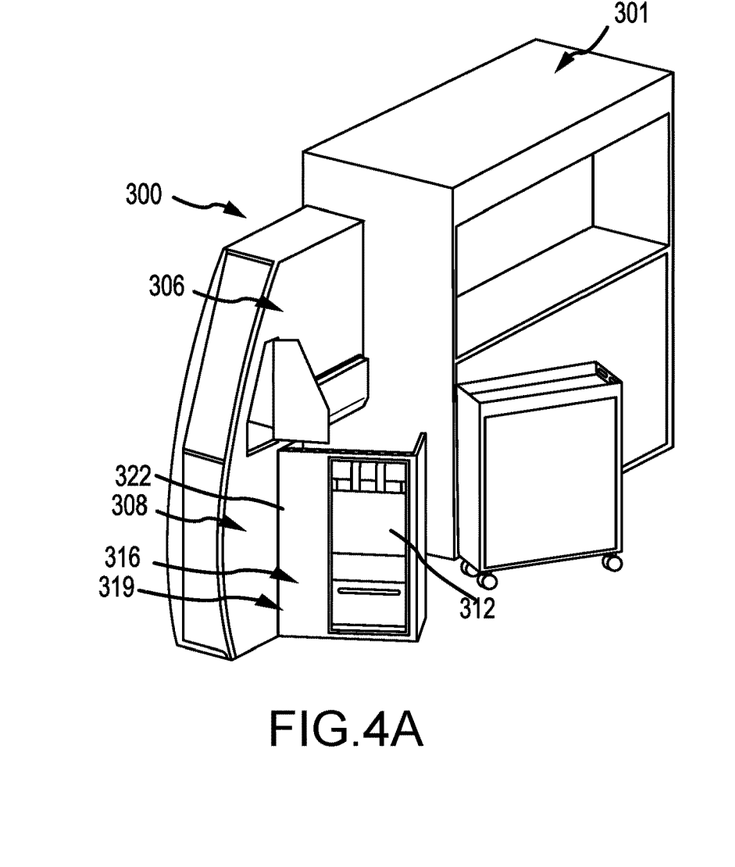
FIGS. 4A-4B illustrate a cabin attendant seat having a storage compartment door in an open position, in accordance with various embodiments
Figure 4B:
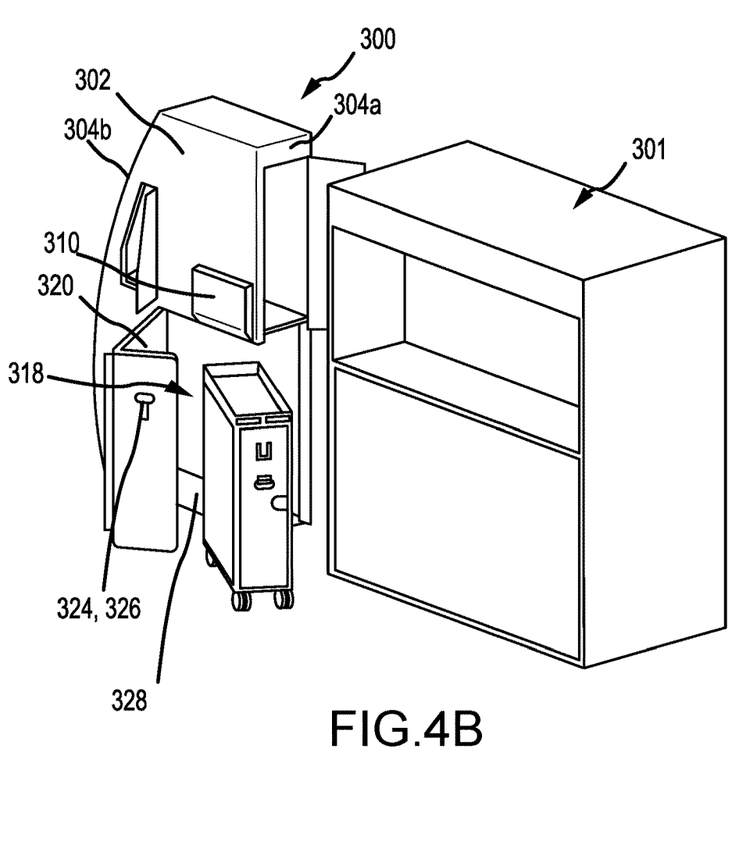

The lower portion 308 is defined by a panel 316. Panel 316 may be configured to rotate relative to the second housing 302 and independently from the upper portion 306 and independently from the seat pan 312. Panel 316 may be rotatably coupled to at least one of the first and second walls 304a, 304b. For instance, the panel 316 may be hinged via a hinge 319 to the first wall 304a such that the panel rotates along an axis parallel to the first wall 304a.

FIG. 3A illustrates the panel 316 in an open position, in accordance with various embodiments. As mentioned herein, second housing 302 may be secured to an aircraft structure, such as a floor or a wall a galley 301 of an aircraft. Outboard closest access is often blocked by galleys, furniture, seats or other monuments. Further, payload may be limited to small items and access is only from the aisle or a small door. However, in the embodiments described herein, opening panel 316 exposes a volume 318 (e.g., a cavity) within second housing 302. In various embodiments, the volume 318 is configured (e.g., sized and shaped) to receive various items for storage. For instance, the volume 318 may store items such as wheelchairs (e.g., see FIGS. 3A-3B), bar carts (e.g., see FIGS. 4A-4B), etc. By mounting the panel 316 to the second housing 302 and incorporating the storage into the seat 300, the volume 318 (e.g., closet/storage space) can be accessed from an emergency exit cross-aisle.

Panel 316 includes an interior (or first) wall 320 and an exterior (or second) wall 322. When panel 316 is in the closed position, as shown in FIG. 3B, interior wall 320 is oriented toward volume 318 (i.e., toward an interior of second housing 302) and exterior wall 322 is oriented away from volume 318 (i.e., away from an interior of second housing 302). For instance, the seat pan 312 and the backrest 314 are coupled to the exterior wall 322 and are configured to move with the panel 316. In accordance with various embodiments, seat 300 includes a latch assembly 324 configured to secure panel 316 to second housing 302. Latch assembly 324 may include a latch open indicator 326. In various embodiments, panel 316 may be a 16G load-rated door. In various embodiments, with reference particularly to FIG. 4B, the seat 300 may include a ramp 328. The ramp 328 may be an angled edge extrusion such that the bar cart is able to be rolled into the volume 318 smoothly.

Figure 5:
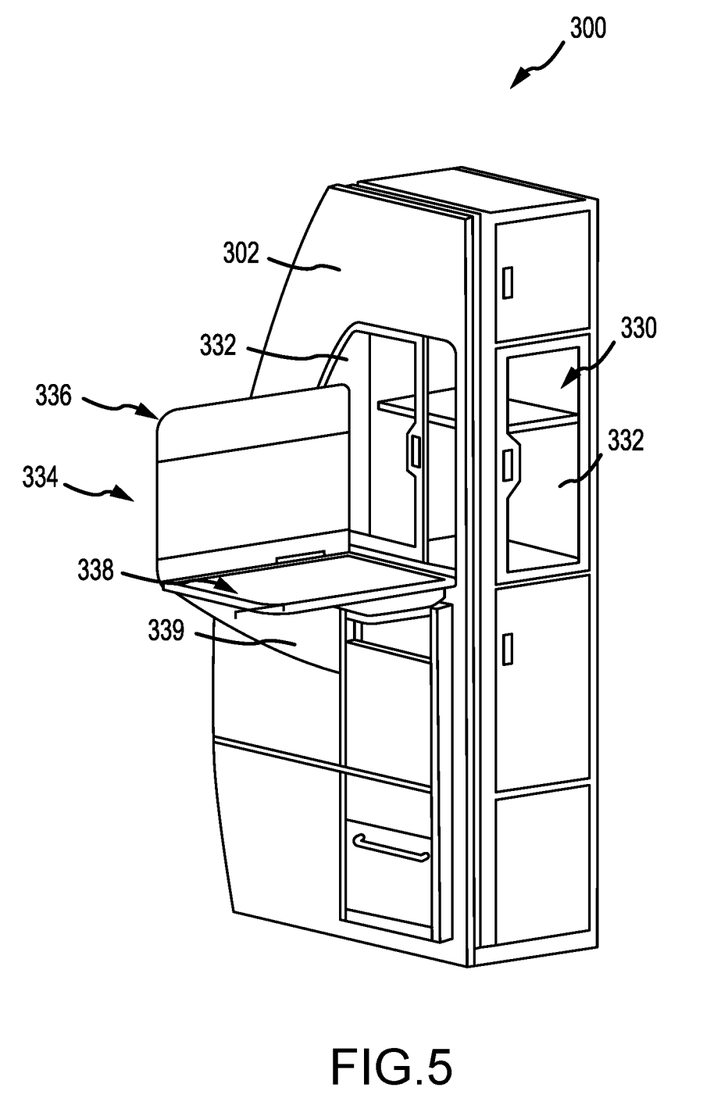
FIG. 5 illustrates a cabin attendant seat having a drop-down tray assembly, in accordance with various embodiments.

Referring now to FIG. 5, in various embodiments, the second housing 302 may be a bar unit 330. For instance, the upper portion 306 may comprise the bar unit 330. The bar unit 330 may include at least one window 332 (e.g., a glass door, a sliding glass door, fixed window) configured to provide visual and/or physical access to beverages stored within the second housing 302. In various embodiments, the second housing includes a drop-down tray assembly 334. Drop-down tray assembly 334 may be configured similarly to the drop-down tray assembly 230. For instance, the drop-down tray assembly 334 may include a first surface 336, a second surface 338, and a support arm 339 corresponding to the first surface 234, the second surface 236, and the support arm 240. Accordingly, in a deployed position, the drop-down tray assembly 334 may expose the at least one window 332.

Figure 6A:
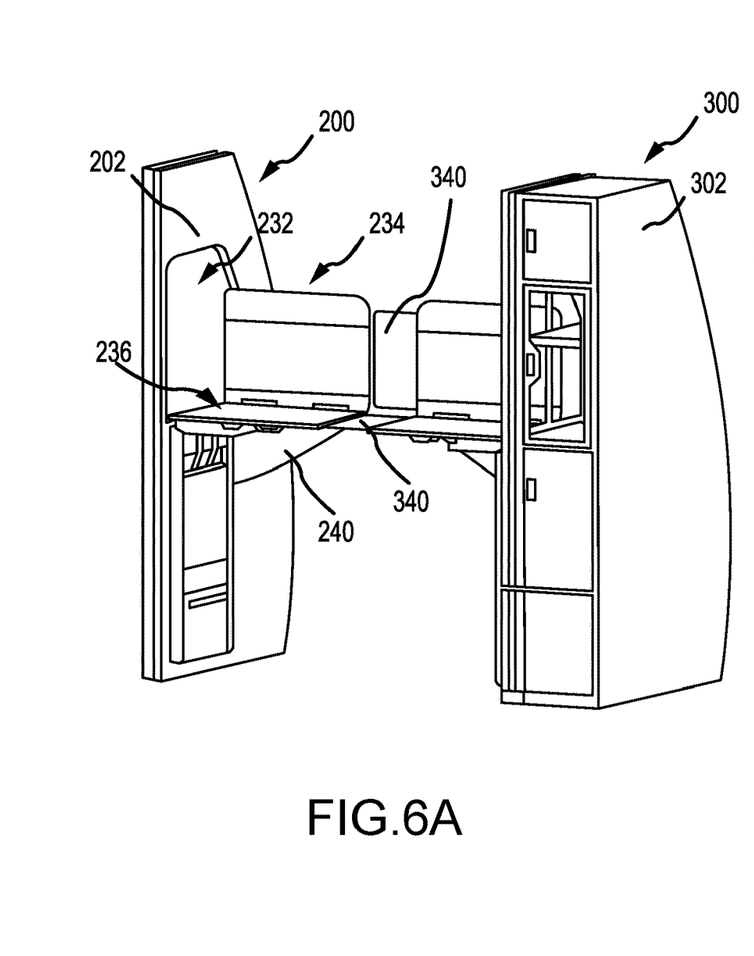
FIGS. 6A-6B illustrate a first cabin attendant seat and a second cabin attendant seat each having a drop-down tray assembly, in accordance with various embodiments.
Figure 6B:
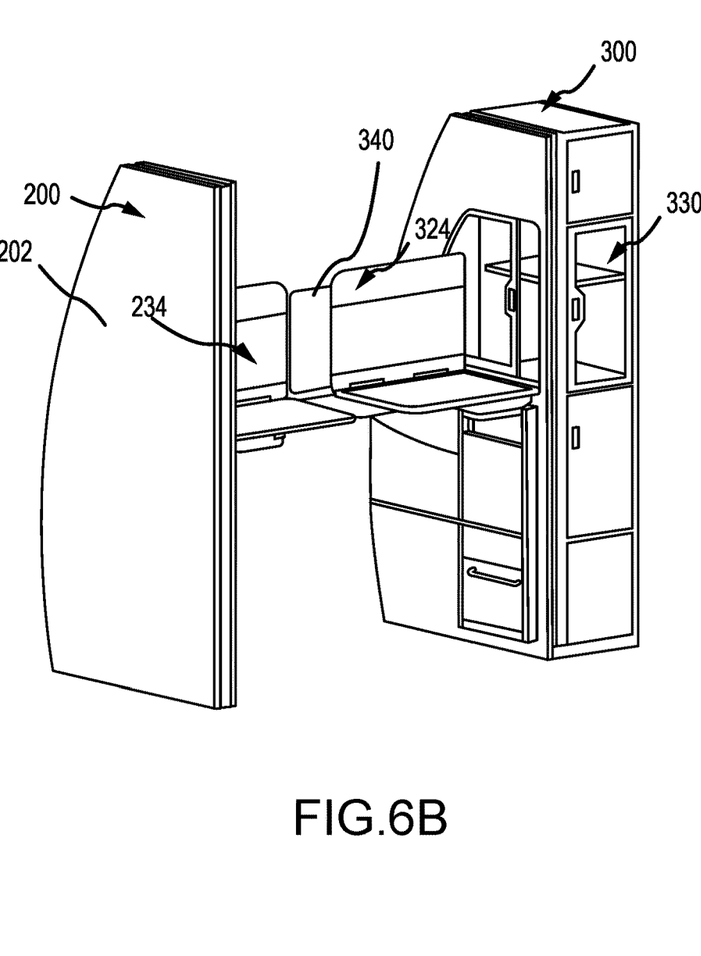

Referring now to FIGS. 6A-6B, the aircraft 100 may include both the first seat 200 and the second seat 300. In various embodiments, the second seat 300 may be positioned opposite the first seat 200. In other words, the first seat 200 and the second seat 300 are in confronting relation, thus creating an aisleway (e.g., an exit zone). For instance, the first seat 200 and the second seat 300 may be positioned on either side of an exit door, and may open facing each other (e.g., the headrest 218 and the headrest 310 are configured to rotate away from their respective housings and toward each other). In flight, when the exit is not needed to be accessible, the drop-down tray assemblies 230, 334 may be deployed to form a social area (e.g., place a beverage on the drop-down tray assemblies 230, 334) and/or workstations.

In various embodiments, the drop-down tray 334 may comprise an at least one extension 340. The extension 340 may be configured to slide out from the drop-down tray 334. For instance, the at least one extension 340 may include a first extension 340a and a second extension 340b. The first extension 340a may be configured to extend from and parallel to the first surface 336. The second extension 340b may be configured to extend from and parallel to the second surface 338. Accordingly, the at least one extension 340 may fill in a gap between the drop-down tray assemblies 230, 334. In various embodiments, the drop-down tray assembly 230 may comprise the at least one extension.

Figure 7A:
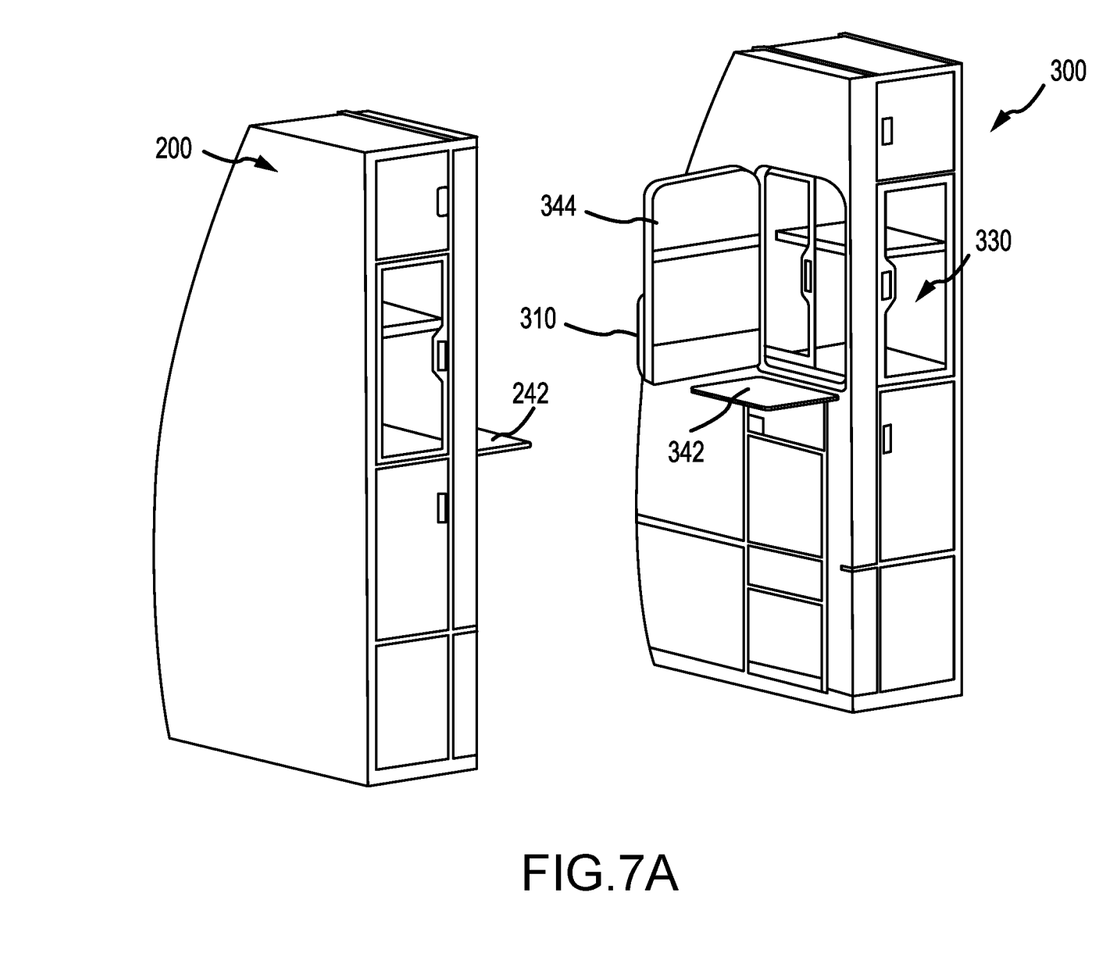
FIGS. 7A, 7B, and 7C illustrate a first cabin attendant seat and a second cabin attendant seat each having a slide-out table, in accordance with various embodiments.
Figure 7B:
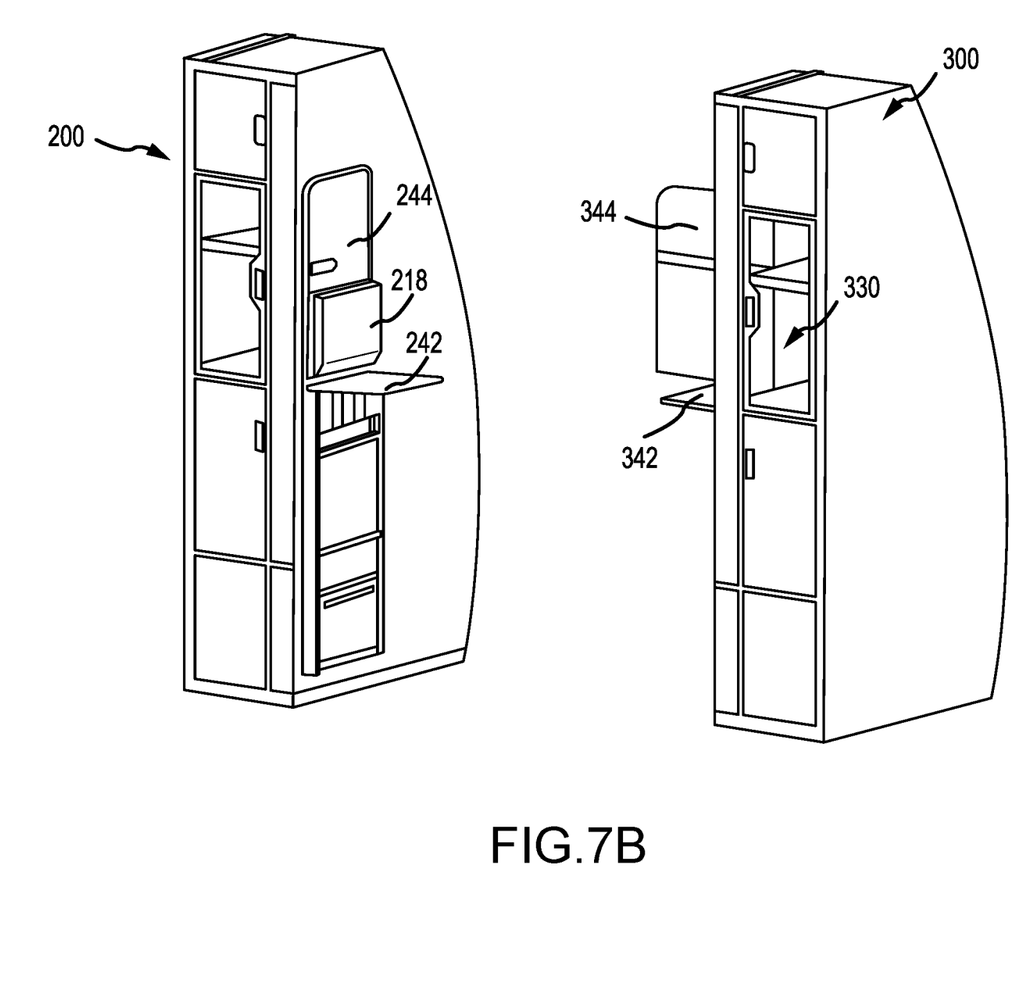
Figure 7C:
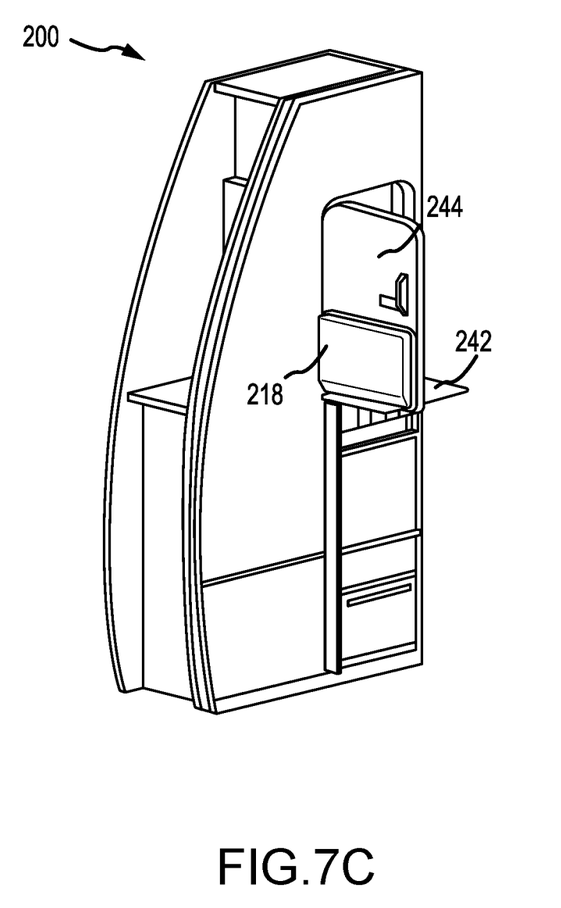

Referring now to FIGS. 7A-7C, the first seat 200 may include a slide-out table 242. For instance, due to the multi-piece configuration of the upper portion 210 and the lower portion 212 and the corresponding gap in between the headrest 218 and seat pan 220/backrest 222, the slide-out table 242 may be disposed in the housing 202 and configured to slide out from the housing 202 underneath the headrest 218. The slide-out table 242 may be a smaller option to the drop-down tray assembly 230. For instance, the slide-out table 242 may be approximately 12.0 in×18.0 in (e.g., 30.48 cm×45.72 cm). Additionally, the upper portion 210 may include a door 244 such that the headrest 218 is coupled to the door 244. The door 244 may be configured to rotate along the axis parallel to the first and second walls 204a, 204b. Further, the second seat 300 may include a slide-out table 342. Similar to the slide-out table 242, the slide-out table 342 may be disposed in the second housing 302 and configured to slide out from the second housing 302 underneath the headrest 310. Additionally, the upper portion 306 may include a door 344 such that the headrest 310 is coupled to the door 344. The door 344 may be configured to rotate along the axis parallel to the first and second walls 304a, 306a. Accordingly, the door 344 may be configured to expose the at least one window 332. The flight attendant may then access the beverages and use the slide-out table 342 as a prep station, for instance.

In various embodiments, the components described herein with reference to each of the first seat 200 and the second seat 300 may be modular and thus various combinations may be formed. For instance, as described herein, the aircraft 100 may include the first seat 200, the second seat 300, or both. In various embodiments, the aircraft 100 may include more than one first seat 200. In various embodiments, the aircraft 100 may include more than one second seat 300 (e.g., see FIGS. 7A-7B). In various embodiments, one second seat 300 may include the bar unit 330 while the second seat 300 does not. In various embodiments, one seat may (e.g., the first seat 200 and/or the second seat 300) may include a drop-down tray assembly (e.g., the drop-down tray assemblies 230, 334) while the other includes only a slide-out table (e.g., slide-out tables 242, 342). In various embodiments, the first seat 200 and/or the second seat 300 includes both the drop-down tray assembly and the slide-out table).

As described herein, the multi-piece CAS system allow heightened flexibility of inflight configurations and functions. Further, the multi-piece CAS system provides lower cost and lower weight due to decreased parts and failure modes, while achieving high versatility. The multi-piece CAS also provides a configuration wherein the exit door is never completely locked, thus increasing safety in an emergency.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cabin attendant seat, comprising:
  a housing having an upper portion and a lower portion;
  a drop-down tray assembly rotatably coupled to the upper portion and further comprising:
    a second surface rotatably coupled to the upper portion by a first hinge such that the second surface defines a platform, and
    a first surface rotatably coupled to the upper portion by the first hinge and rotatably coupled to the second surface by a second hinge,
  a support arm rotatably coupled to the drop-down tray portion by the first hinge and rotatably coupled to the second surface by a third hinge;
  a headrest rotatably coupled to the upper portion; and
  a seat pan coupled to the lower portion, the seat pan detached from the headrest by a gap of between 1.0 inch and 4.0 inches.

2. The cabin attendant seat of claim 1, wherein the support arm is configured to rotate along a first axis and a second axis, and is configured to support the drop-down tray assembly in a deployed position.

3. The cabin attendant seat of claim 1, wherein the upper portion and the lower portion are separated by a gap of between 1.0 inch and 4.0 inches.

4. The cabin attendant seat of claim 3, further comprising a slide-out table configured to be stored in the housing and accessible from the housing via the gap.

5. The cabin attendant seat of claim 1, further comprising a lower storage compartment disposed in the lower portion below the seat pan.

6. A cabin attendant seat, comprising:
  a housing having an upper portion and a lower portion;
  a headrest rotatably coupled to the upper portion;
  a panel further comprising:
    a first panel portion;
    a second panel portion;
    an interior wall of the first panel portion, wherein the second panel portion is coupled and perpendicular to the interior wall of the first panel portion; and
    an exterior wall of the first panel portion opposite the interior wall,
    wherein the panel defines the lower portion,
    wherein the panel is configured to rotate relative the housing and independently from the upper portion; and
  a seat pan coupled to the exterior wall.

7. The cabin attendant seat of claim 6, wherein rotating the panel to an open position exposes a volume configured to receive a storage item.

8. The cabin attendant seat of claim 7, wherein the interior wall is configured to be oriented toward the volume in a closed position.

9. The cabin attendant seat of claim 6, further comprising a latch assembly configured to secure the panel to the housing.

10. The cabin attendant seat of claim 6, wherein the upper portion defines a bar unit, the bar unit comprising at least one window.

11. The cabin attendant seat of claim 6, further comprising a drop-down tray assembly rotatably coupled to the upper portion, wherein the drop-down tray assembly and the headrest are configured to rotate along a first axis such that the drop-down tray assembly defines a platform, and wherein the panel is configured to rotate along a second axis perpendicular to the first axis.

12. An aircraft comprising:
  a first cabin attendant seat, comprising:
    a first housing having a first upper portion and a first lower portion;
    a first headrest rotatably coupled to the first upper portion; and
    a first drop-down tray assembly rotatably coupled to the first upper portion,
    wherein the first drop-down tray assembly and the first headrest are configured to rotate along a first axis;
    a first seat pan; and
  a second cabin attendant seat, comprising:
    a second housing having a second upper portion and a second lower portion;
    a second headrest rotatably coupled to the second upper portion, wherein the first headrest and the second headrest are configured to rotate independently; and
    a second drop-down tray assembly rotatably coupled to the second upper portion, wherein the second drop-down tray assembly and the second headrest are configured to rotate along a first axis; and
  a second seat pan coupled to the exterior wall,
  wherein the first cabin attendant seat and the second cabin attendant seat are in confronting relation, and wherein the first drop-down tray assembly comprises at least one extension configured to extend from the first drop-down tray assembly toward the second cabin attendant seat.

13. The aircraft of claim 12, wherein the first upper portion and the first lower portion are separated by a first gap wherein the first drop-down tray assembly is configured to be hinged in the first gap, and wherein the second upper portion and the second lower portion are separated by a second gap wherein the second drop-down tray assembly is configured to be hinged in the second gap.

14. The aircraft of claim 12, wherein the first drop-down tray assembly is configured to be housing within a workstation cavity disposed in the first housing, the first drop-down tray assembly exposing the workstation cavity when in a deployed position.

15. The aircraft of claim 14, wherein the workstation cavity comprises at least one of a power outlet or a network port to couple to a laptop.

* * * * *